(12) United States Patent
Hedlund

(10) Patent No.: US 11,331,968 B2
(45) Date of Patent: May 17, 2022

(54) MACHINE AND PUSHBAR ASSEMBLY ASSOCIATED WITH MACHINE

(71) Applicant: Caterpillar Paving Products Inc., Brooklyn Park, MN (US)

(72) Inventor: Roger Allen Hedlund, Champlin, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 205 days.

(21) Appl. No.: 16/787,181

(22) Filed: Feb. 11, 2020

(65) Prior Publication Data

US 2020/0180372 A1 Jun. 11, 2020

(51) Int. Cl.
*B60D 1/155* (2006.01)
*B60D 1/145* (2006.01)
*B60D 1/36* (2006.01)

(52) U.S. Cl.
CPC .............. *B60D 1/155* (2013.01); *B60D 1/145* (2013.01); *B60D 1/36* (2013.01)

(58) Field of Classification Search
CPC .................................. B60D 1/155; B60D 3/00
See application file for complete search history.

(56) References Cited

U.S. PATENT DOCUMENTS

| | | | | |
|---|---|---|---|---|
| 1,794,148 A | * | 2/1931 | Collins ................... | B60P 3/125 414/563 |
| 2,904,348 A | * | 9/1959 | Quastad .................. | B60D 1/04 280/477 |
| 2,916,301 A | * | 12/1959 | Cushman ............ | B62D 49/0642 280/491.4 |
| 3,011,800 A | * | 12/1961 | Mitsuyasu ............. | B60D 1/155 280/482 |
| 3,105,706 A | * | 10/1963 | Adam ...................... | B60D 1/54 280/491.4 |
| 3,281,163 A | * | 10/1966 | Wiebe ...................... | B60D 3/00 280/491.4 |
| 3,332,562 A | * | 7/1967 | Kokott ................... | B62D 49/04 414/563 |
| 3,649,048 A | | 3/1972 | Garnett | |
| 4,577,883 A | * | 3/1986 | Duncan .................... | B60D 1/54 280/491.4 |
| 4,699,394 A | * | 10/1987 | Laie ....................... | B60D 1/155 280/484 |
| 4,714,265 A | * | 12/1987 | Franklin .................. | B60D 1/40 280/482 |

(Continued)

FOREIGN PATENT DOCUMENTS

WO      2019058369      3/2019

*Primary Examiner* — Kevin Hurley
(74) *Attorney, Agent, or Firm* — Jeff A. Greene

(57) ABSTRACT

A rotary mixer includes a frame. The rotary mixer also includes a pushbar assembly disposed at a front end of the rotary mixer. The pushbar assembly includes a pushbar adapted to be pivotally coupled to the frame in a deployed position of the pushbar. The pushbar assembly also includes a support assembly for the pushbar. The support assembly includes a support structure pivotally coupled to the frame. The support assembly also includes a harnessing member having a first end adapted to be coupled to the pushbar and a second end adapted to be coupled to the support structure adapted to hold the pushbar in the deployed position.

18 Claims, 5 Drawing Sheets

(56) References Cited

U.S. PATENT DOCUMENTS

| | | | | |
|---|---|---|---|---|
| 5,224,960 | A * | 7/1993 | Duncan | B60D 1/54 |
| | | | | 280/491.4 |
| 5,382,042 | A | 1/1995 | Mcphee | |
| 10,759,325 | B1 * | 9/2020 | Polny | B60D 1/02 |
| 11,148,492 | B2 * | 10/2021 | Withrow | B60D 1/52 |
| 2014/0138934 | A1 * | 5/2014 | Huhn | B60D 3/00 |
| | | | | 280/481 |

* cited by examiner

MACHINE AND PUSHBAR ASSEMBLY ASSOCIATED WITH MACHINE

TECHNICAL FIELD

The present disclosure relates to a machine having a pushbar assembly.

BACKGROUND

Reclaimer/stabilizer machines, such as rotary mixers, typically utilize a pushbar. The pushbar is generally used to connect the machine to a vehicle, such as a water or emulsion/additive truck, that needs to be pushed or pulled. More particularly, one end of the pushbar is coupled to a frame of the machine and another end of the pushbar is coupled to the vehicle.

When the reclaimer/stabilizer machine needs to be repositioned, the pushbar is detached from the vehicle to allow machine repositioning. In such situations, the pushbar contacts with a ground surface and drags along the ground surface as the machine is maneuvering to a desired position. The dragging of the pushbar along the ground surface may cause damage to the pushbar, which is not desirable.

WO Patent Application 2019/058369 describes a foldable towing device includes a first arm having a first end detachably attachable to a towing vehicle and a second end. The first arm is connectable to a first end of a first tensioning device and to a first end of a second tensioning device. The device includes a second arm having a first end rotatably and movably attached to the second end of the first arm and a second end detachably attachable to a first docking member of a towed cabin. The second arm is connectable to a second end of the first tensioning device. The device also includes a third arm having a first end rotatably and movably attached to the second end of the first arm and a second end detachably attachable to a second docking member of the towed cabin. The third arm is connectable to a second end of the second tensioning device.

SUMMARY OF THE DISCLOSURE

In an aspect of the present disclosure, a rotary mixer is provided. The rotary mixer includes a frame. The rotary mixer also includes a pushbar assembly disposed at a front end of the rotary mixer. The pushbar assembly includes a pushbar adapted to be pivotally coupled to the frame in a deployed position of the pushbar. The pushbar assembly also includes a support assembly for the pushbar. The support assembly includes a support structure pivotally coupled to the frame. The support assembly also includes a harnessing member having a first end adapted to be coupled to the pushbar and a second end adapted to be coupled to the support structure adapted to hold the pushbar in the deployed position.

In another aspect of the present disclosure, a machine is provided. The machine includes a frame. The machine also includes a pushbar assembly disposed at a front end of the machine. The pushbar assembly includes a pushbar adapted to be pivotally coupled to the frame in a deployed position of the pushbar. The pushbar assembly also includes a support assembly for the pushbar. The support assembly includes a support structure pivotally coupled to the frame. The support assembly also includes a harnessing member having a first end adapted to be coupled to the pushbar and a second end adapted to be coupled to the support structure adapted to hold the pushbar in the deployed position.

In yet another aspect of the present disclosure, a pushbar assembly disposed at a front end of a machine is provided. The pushbar assembly includes a pushbar adapted to be pivotally coupled to a frame of the machine in a deployed position of the pushbar. The pushbar assembly also includes a support assembly for the pushbar. The support assembly includes a support structure pivotally coupled to the frame. The support assembly also includes a harnessing member having a first end adapted to be coupled to the pushbar and a second end adapted to be coupled to the support structure adapted to hold the pushbar in the deployed position.

Other features and aspects of this disclosure will be apparent from the following description and the accompanying drawings.

DETAILED DESCRIPTION

Figure 1:
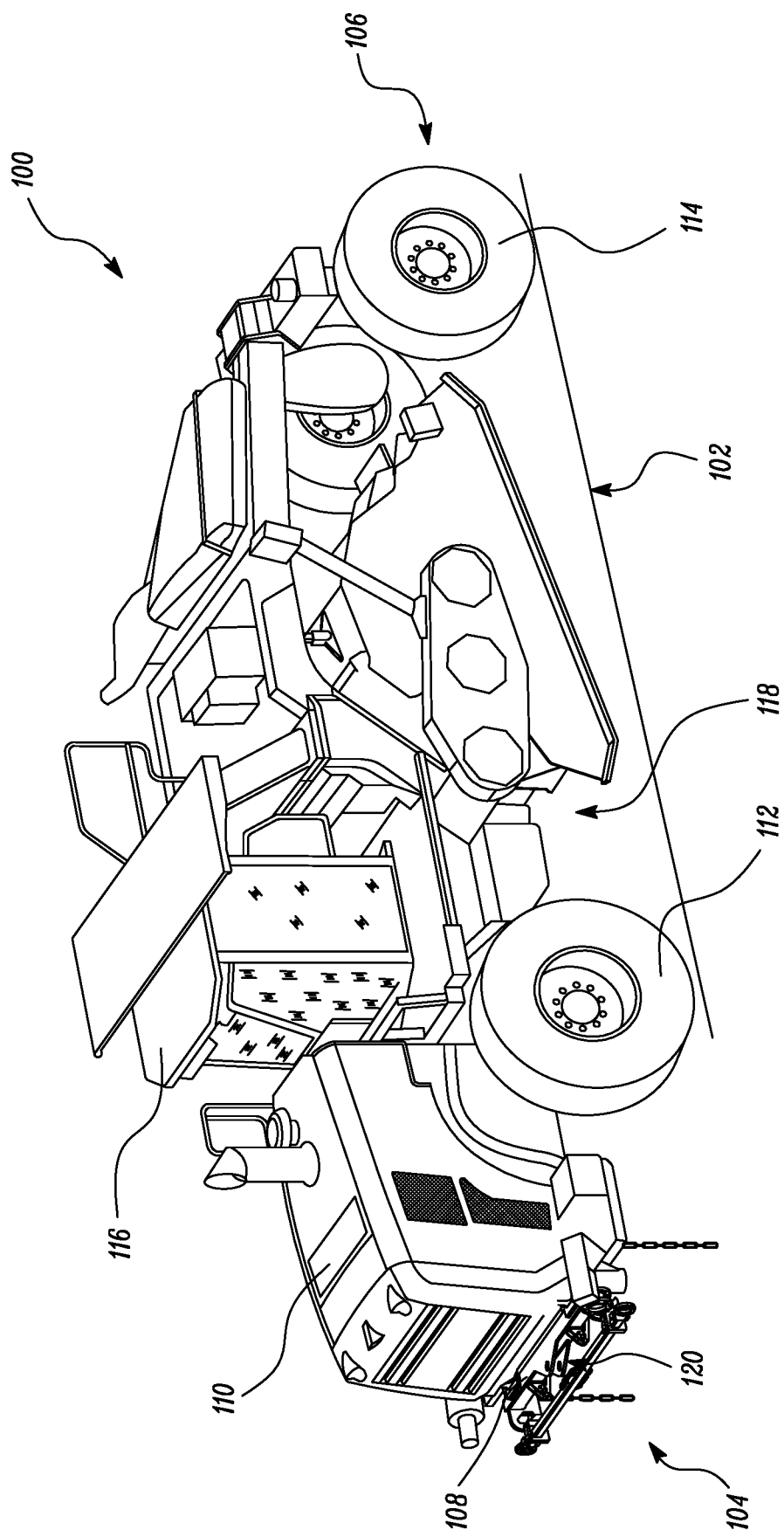
FIG. 1 is a perspective view of a machine, according to one embodiment of the present disclosure.

Wherever possible, the same reference numbers will be used throughout the drawings to refer to the same or like parts. FIG. 1 is a perspective view of a machine 100, according to one embodiment of the present disclosure. The machine 100 is embodied as a rotary mixer herein. Further, the machine 100 may be hereinafter interchangeably referred to as the rotary mixer 100, without any limitations. In other examples, the machine 100 may include another machine used for milling, road reclamation, soil stabilization, surface pulverization, and other related applications. The machine 100 operates on a ground surface 102.

The machine 100 defines a front end 104 and a rear end 106. The machine 100 includes a frame 108. An engine (not shown) is positioned proximate to the front end 104 within an engine compartment (not shown). The engine compartment is covered by a hood 110 that may be opened to access the engine. The engine is generally an internal combustion engine that drives a rotor and hydraulic pumps of the machine 100 which is turn provide propulsion to the machine 100 and also powers various components of the machine 100.

A pair of front wheels 112 are defined proximate to the front end 104 of the machine 100. Further, a pair of rear wheels 114 are defined proximate to the rear end 106 of the machine 100. Alternatively, the machine 100 may include tracks (not shown) instead of the wheels 112, 114. The machine 100 has an operator cabin 116. When the machine 100 is embodied as a manual or semi-autonomous machine, an operator of the machine 100 may sit in the operator cabin 116 to operate the machine 100.

Further, the machine 100 includes a mixing chamber 118 defined between the front and rear wheels 112, 114. The mixing chamber 118 is an enclosed space that is defined under the frame 108 and extends laterally across the machine 100. Moreover, a rotor (not shown) is disposed within the mixing chamber 118. The rotor is rotatably coupled to the machine 100 for performing one or more machine operations, such as cutting, mixing, and/or pulverizing material. The rotor is powered by the engine. The rotor generally includes a shell member and a number of cutting assemblies disposed on the shell member.

Figure 2:
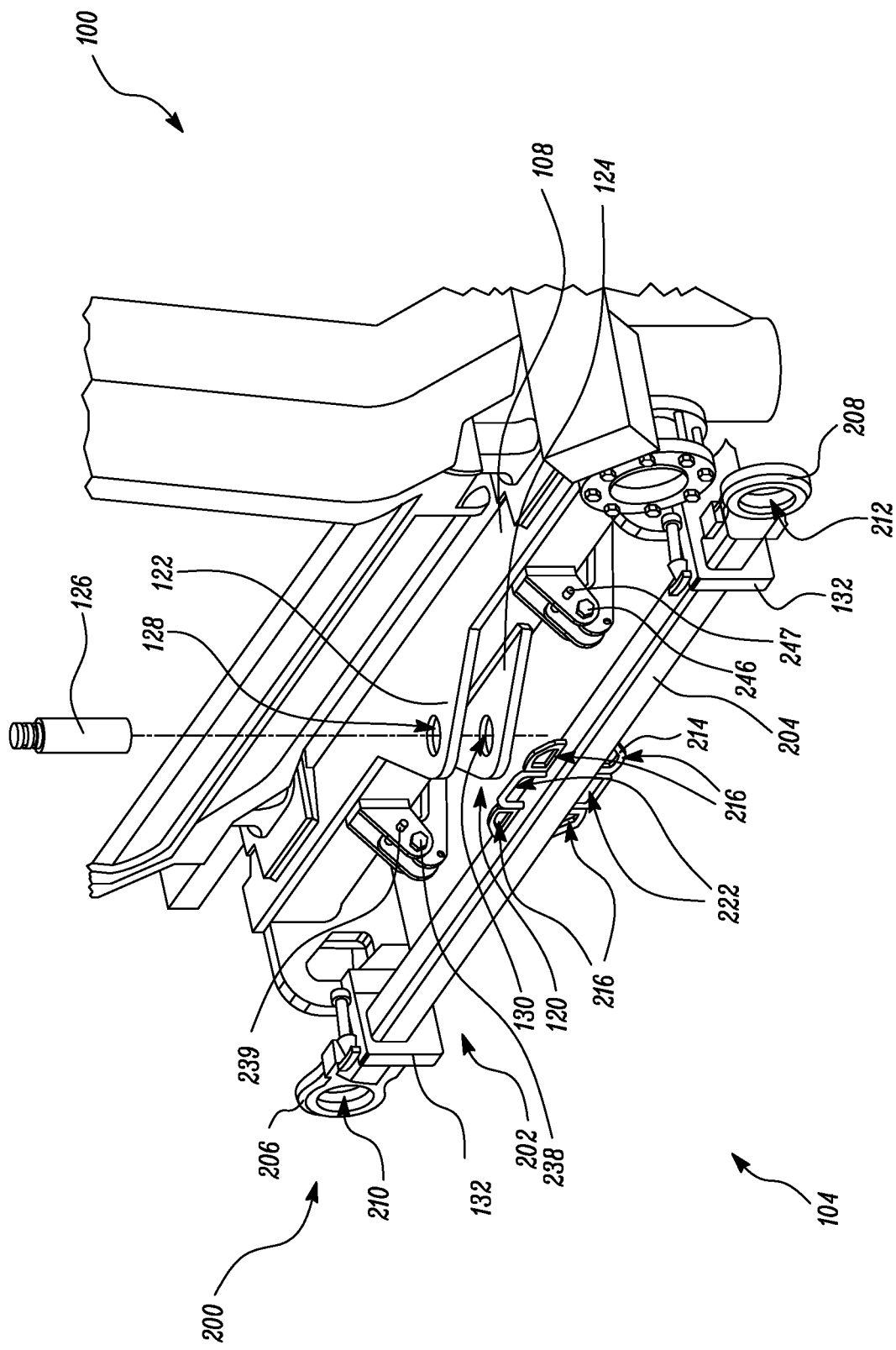
FIG. 2 illustrates a perspective view of a pushbar assembly disposed at a front end of the machine of FIG. 1, according to one embodiment of the present disclosure.

As shown in FIG. 2, a hitch assembly 120 is associated with the frame 108. The hitch assembly 120 is disposed at the front end 104 of the machine 100. The hitch assembly 120 includes a first bracket 122, a second bracket 124, and a first mechanical fastener 126. Each of the first and second brackets 122, 124 extend from the frame 108 and are integral with the frame 108. The first bracket 122 defines a first aperture 128 and the second bracket 124 defines a second aperture 130. Further, the first mechanical fastener 126 may include any one of a screw, bolt, pin, and the like. Moreover, a pair of retention brackets 132 are coupled to the frame 108 at the front end 104 of the machine 100. Each of the retention brackets 132 may open or close, such that the retention brackets 132 define a through opening 134 (shown in FIG. 3) when the retention brackets 132 are in the closed position.

Further, the machine 100 includes a pushbar assembly 200 disposed at the front end 104 of the machine 100. The pushbar assembly 200 includes a pushbar 202. The pushbar 202 is in a deployed position when the pushbar 202 is coupled between the machine 100 and another vehicle (not shown), such as an emulsion or additive truck, for pulling or pushing the vehicle. Further, the pushbar 202 can be stored proximate to the front end 104 of the machine 100 when the pushbar 202 is not in use. The pushbar 202 is shown in the deployed position in FIG. 3 and in a stored position in FIGS. 1, 2, and 4.

As illustrated in FIG. 2, the pushbar 202 includes a rod member 204, a first eye end 206, and a second eye end 208. The rod member 204 may have a square cross-section, a rectangular cross-section, or a circular cross-section, without any limitations. In the deployed position of the pushbar 202, one of the first and second eye ends 206, 208 is coupled to the frame 108, whereas another of the first and second eye ends 206, 208 is coupled to the vehicle. Each of the first and second eye ends 206, 208 define a first through aperture 210 and a second through aperture 212, respectively, to allow mechanical coupling of the pushbar 202 with the machine 100 or the vehicle. Further, the pushbar 202 includes a plate member 214 that is centrally disposed on the pushbar 202. The plate member 214 defines one or more first slots 216 to receive a first end 218 (shown in FIG. 3) of a harnessing member 220 (shown in FIG. 3). In the illustrated example, the plate member 214 defines four first slots 216. The first slots 216 are embodied as key slots. Further, the plate member 214 also defines a pair of gripping surfaces 222 that allows a personnel to grip the pushbar 202 when the pushbar 202 is being deployed or stored.

Figure 3:
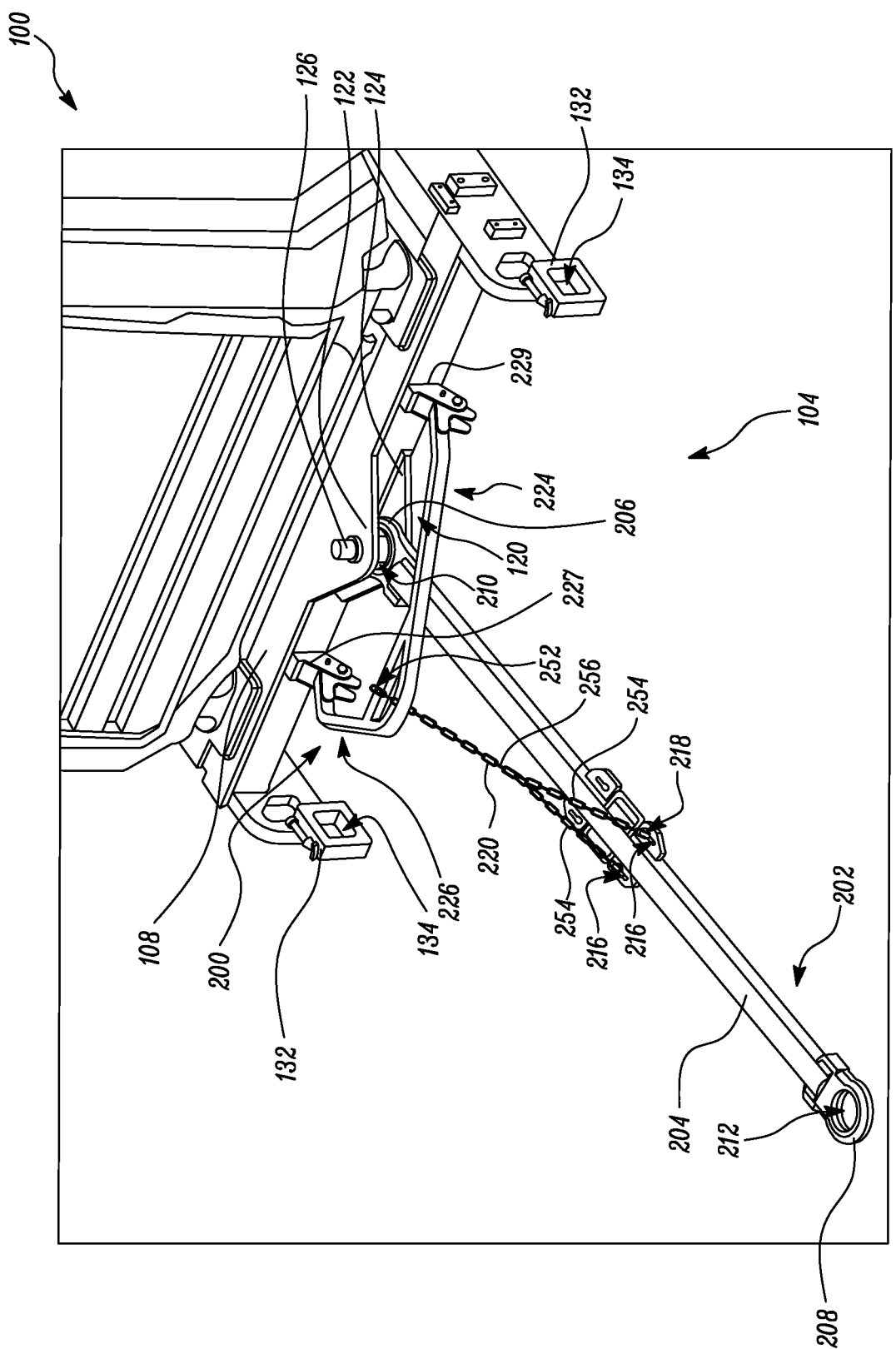
FIG. 3 illustrates a pushbar supported by a support assembly associated with the pushbar assembly of FIG. 2.

Referring now to FIG. 3, the pushbar 202 is pivotally coupled to the frame 108 in the deployed position of the pushbar 202. In the illustrated example, the hitch assembly 120 is coupled with the first eye end 206 of the pushbar 202. Alternatively, the hitch assembly 120 may be coupled with the second eye end 208 of the pushbar 202, without any limitations. For coupling the pushbar 202 with the machine 100, the first mechanical fastener 126 is aligned with the first aperture 128 (see FIG. 2) of the first bracket 122, the first through aperture 210 of the first eye end 206, and the second aperture 130 (see FIG. 2) of the second bracket 124 to pivotally couple the pushbar 202 with the frame 108 of the machine 100.

Further, when the pushbar 202 is to be stored, the first mechanical fastener 126 is removed from the apertures 130, 210, 128 to disengage the pushbar 202 from the hitch assembly 120. The pushbar 202 is then stored proximate to the front end 104 of the machine 100. The pushbar 202 is in the stored position when the pushbar 202 is received within the retention brackets 132. More particularly, the retention brackets 132 open so that the rod member 204 of the pushbar 202 can be received by the retention brackets 132. Once the pushbar 202 is received in the retention brackets 132, the retention brackets 132 are closed such that the push bar 202 is held within the through openings 134 to allow storage of the pushbar 202.

Further, the pushbar assembly 200 includes a support assembly 224 for the pushbar 202. The support assembly 224 supports the pushbar 202 in the deployed position. The support assembly 224 is disposed at the front end 104 of the machine 100. The support assembly 224 includes a support structure 226 pivotally coupled to the frame 108. The support structure 226 is pivotally coupled to the frame 108 by a pair of bracket members 227, 229. The bracket members 227, 229 are fixedly coupled to the frame 108. Each of the bracket members 227, 229 define a pair of through apertures (not shown).

As illustrated in the accompanying figures, when the pushbar 202 is to be coupled to the support assembly 224, the support structure 226 pivots about the frame 108 such that the support structure 226 is disposed in front of the frame 108. Further, the support structure 226 is disposed in front of the frame 108 such that the hood 110 (see FIG. 1) may open or close without interfering with the support structure 226. Thus, dimensions of the support structure 226 as well as an angle at which the support structure 226 is disposed relative to the frame 108 in the deployed position are decided such that the support structure 226 does not interfere with the hood 110.

Figure 4:
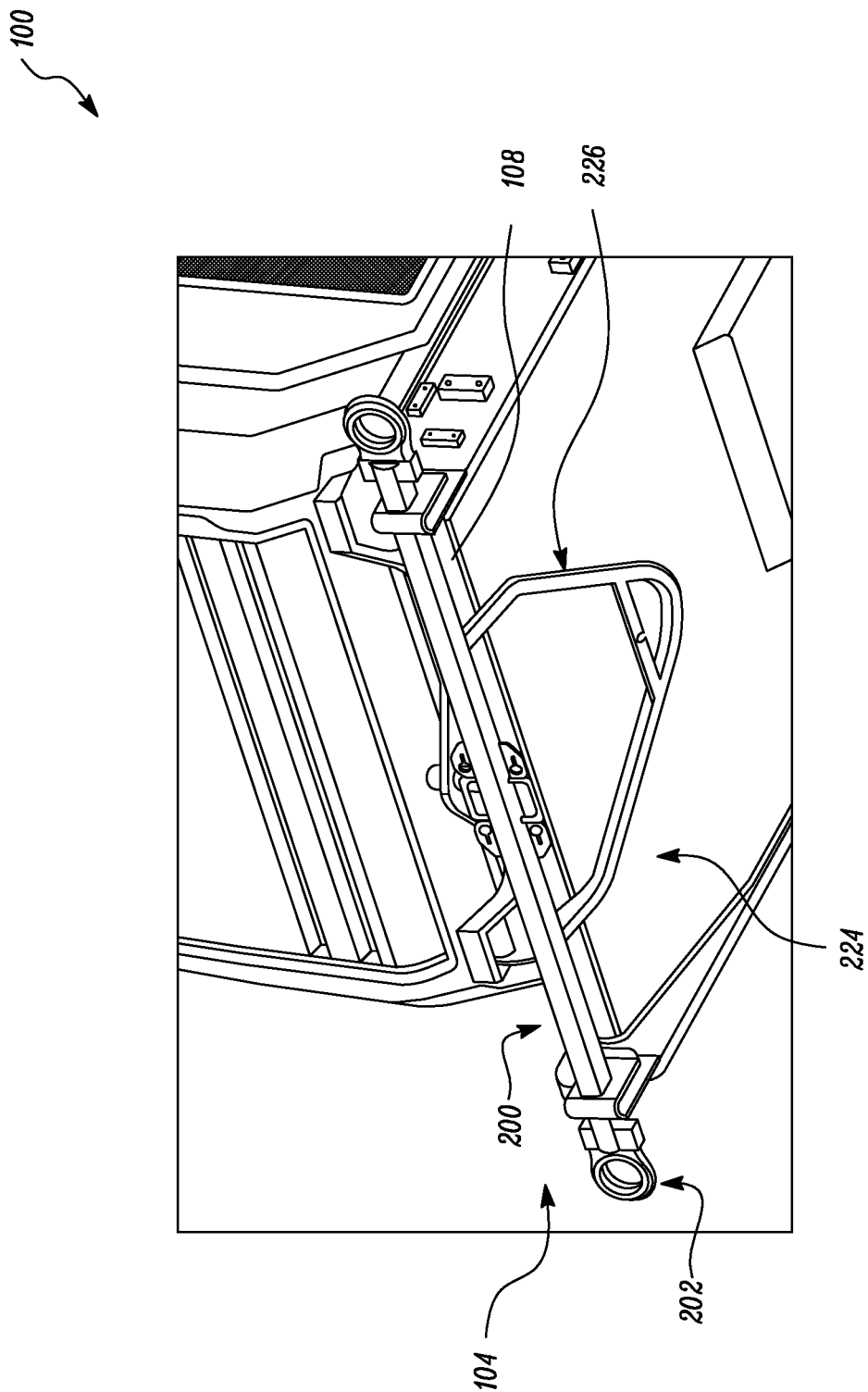
FIG. 4 illustrates a support structure of the support assembly of FIG. 3 stored under the machine.

Further, as illustrated in FIG. 4, the support structure 226 pivots relative to the frame 108 for storage of the support structure 226 underneath the machine 100. More particularly, the support structure 226 folds and is stored below the frame 108. Thus, dimensions of the support structure 226 are decided such that the support structure 226 can fold under the frame 108 without interfering with the ground surface 102.

Figure 5:
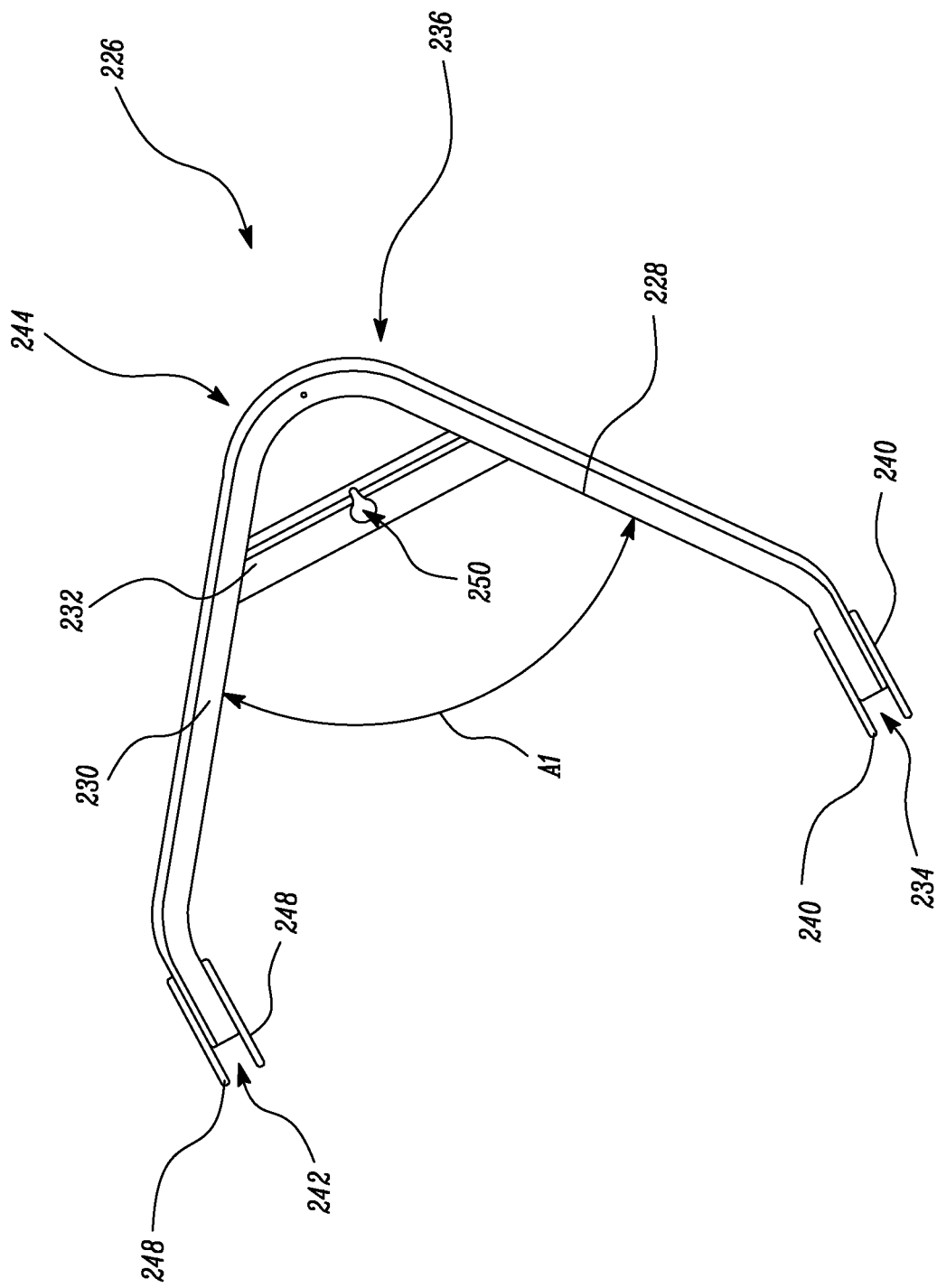
FIG. 5 illustrates a perspective view of the support structure of FIG. 4.

The support structure 226 is made of a metal, such as mild steel. As shown in FIG. 5, the support structure 226 includes a first frame member 228, a second frame member 230 angularly disposed relative to the first frame member 228, and a third frame member 232 extending between the first and second frame members 228, 230. The first and second frame members 228, 230 are embodied as rod members having a square cross-section. Alternatively, the first and second frame members 228, 230 may be embodied as plates, cylindrical rods, rod members having a rectangular cross-section, etc. The first and second frame members 228, 230 are disposed in a V-shaped structure such that an angle "A1" is defined therebetween. The angle "A1" may vary between 45 Degrees to 150 Degrees, approximately, without any limitations. In the illustrated example, the angle "A1" lies between 45 Degrees and 90 Degrees, approximately.

The first frame member 228 defines a first frame end 234 and a second frame end 236. The first frame end 234 of the first frame member 228 is pivotally coupled with the bracket member 227 by a second mechanical fastener 238 and a first pin 239. More particularly, the first frame end 234 defines a pair of parallel plates 240. Each of the plates 240 define a pair of through apertures (not shown). The through apertures in the plates 240 align with the corresponding through apertures defined in the bracket member 227 to receive the second mechanical fastener 238 and the first pin 239 for pivotally coupling the first frame member 228 with the bracket member 227.

Further, the second frame member 230 defines a third frame end 242 and a fourth frame end 244. The third frame end 242 of the second frame member 230 is pivotally coupled with the bracket member 229 by a third mechanical fastener 246 and a second pin 247. More particularly, the third frame end 242 defines a pair of parallel plates 248. Each of the plates 248 define a pair of through apertures (not shown). The through apertures in the plates 248 align with the corresponding through apertures defined in the bracket member 229 to receive the third mechanical fastener 246 and the second pin 247 for pivotally coupling the second frame member 230 with the bracket member 229. Further, the second frame end 236 of the first frame member 228 is fixedly coupled to the fourth frame end 244 of the second frame member 230. It should be noted that the second and third mechanical fasteners 238, 246 may include any one of a screw, bolt, pin, and the like.

The first and second frame members 228, 230 are integrally coupled to each other. In some examples, the first and second frame members 228, 230 may be embodied as a unitary component. The first and second frame members 228, 230 may be manufactured by molding or casting. In some examples, a stock of material may be bent to form the first and second frame members 228, 230. Alternatively, the first and second frame members 228, 230 may be manufactured as separate components that are joined together by welding, soldering, brazing, or any other joining technique.

In another example, the support structure 226 may include a C-shaped structure. In such an example, the first and second frame members 228, 230 may extend substantially parallel to each other such that another frame member extends between the second frame end 236 and the fourth frame end 244 of the first and second frame members 228, 230, respectively. It should be noted that the support structure 226 may include any other shape or configuration, without any limitations.

Further, the third frame member 232 is embodied as a rectangular plate. Alternatively, the third frame member 232 may be embodied as a rod member extending between the first and second frame members 228, 230. The third frame member 232 defines a second slot 250 to receive a second end 252 of the harnessing member 220. The second slot 250 is embodied as a key slot. The second slot 250 is centrally defined in the third frame member 232. Further, the third frame member 232 may be coupled with the first and second frame members 228, 230 by welding, soldering, brazing, etc. In some examples, the first, second, and third frame members 228, 230, 232 may be manufactured as a unitary component.

Referring now to FIG. 3, the support assembly 224 includes the harnessing member 220. The harnessing member 220 has the first end 218 coupled to the pushbar 202 and the second end 252 coupled to the support structure 226 to hold the pushbar 202 in the deployed position. In the illustrated example, the harnessing member 220 is a chain. Alternatively, the harnessing member 220 may be embodied as a cable or a rope that is sufficiently sturdy to hold the pushbar 202.

The harnessing member 220 defines a pair of first portions 254 and a second portion 256. The pair of first portions 254 are coupled to the second portion 256. The first end 218 of the harnessing member 220 is defined by the pair of first portions 254. Further, the second end 252 of the harnessing member 220 is defined by the second portion 256. In order to support the pushbar 202 in the deployed position, the pair of first portions 254 are coupled with the pushbar 202 and the second portion 256 is coupled to the support structure 226. More particularly, two of the first slots 216 receive and engage with the first end 218 of the harnessing member 220, whereas the second slot 250 (see FIG. 5) receives and engages with the second end 252 of the harnessing member 220.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The support assembly 224 associated with the pushbar assembly 200 described herein provides a simple, effective, and cost-efficient solution to hold the pushbar 202 in instances wherein the pushbar 202 is in the deployed condition and the pushbar 202 is not coupled with another vehicle. Thus, any possibility of damage to the pushbar 202 due to dragging of the pushbar 202 along the ground surface 102 is eliminated, which in turn improves operating life of the pushbar 202

The support assembly 224 includes cost effective components that are easily available. Further, the support assembly 224 can be quickly deployed by pivoting the support structure 226 relative to the frame 108 and coupling the harnessing member 220 to the support structure 226 and the pushbar 202. Once the harnessing member 220 is coupled with the first and second slots 216, 250, the pushbar 202 is retained in a generally horizontal position by a weight of the pushbar 202.

Further, the support structure 226 may be pivoted relative to the frame 108 so that the support structure 226 is stored under the frame 108 of the machine 100, thereby eliminating any possibility of interference of the support structure 226 with surrounding objects when the support assembly 224 is not in use. Moreover, in the deployed position, the support assembly 224 does not interfere with other components of the machine 100, such as the hood 110 of the machine 100. It should be noted that the support structure 226 may be easily pivoted by a personnel to deploy or store the support structure 226. The support assembly 224 may be easily retrofitted on existing machines with limited modifications, in turn, providing flexibility and compatibility.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:
1. A rotary mixer comprising:
a frame; and a pushbar assembly disposed at a front end of the rotary mixer, the pushbar assembly comprising:
 a pushbar adapted to be pivotally coupled to the frame in a deployed position of the pushbar; and
 a support assembly for the pushbar, the support assembly comprising:
  a support structure pivotally coupled to the frame, by a pair of bracket members; and
  a harnessing member having a first end adapted to be coupled to the pushbar and a second end adapted to be coupled to the support structure adapted to hold the pushbar in the deployed position.

2. The rotary mixer of claim 1, wherein the support structure is adapted to pivot relative to the frame for storage of the support structure underneath the rotary mixer.

3. The rotary mixer of claim 1, wherein the pushbar defines at least one first slot adapted to receive the first end of the harnessing member.

4. The rotary mixer of claim 1, wherein the support structure includes a first frame member, a second frame member angularly disposed relative to the first frame member, and a third frame member extending between the first and second frame members.

5. The rotary mixer of claim 4, wherein the third frame member defines a second slot adapted to receive the second end of the harnessing member.

6. The rotary mixer of claim 1, wherein the harnessing member is a chain.

7. A machine comprising:
 a frame; and
 a pushbar assembly disposed at a front end of the machine, the pushbar assembly comprising:
  a pushbar, defining a first slot and adapted to be pivotally coupled to the frame in a deployed position of the pushbar; and
  a support assembly for the pushbar, the support assembly comprising:
   a support structure pivotally coupled to the frame; and
   a harnessing member having a first end adapted to be coupled to the pushbar, by being received in the first slot of the pushbar and a second end adapted to be coupled to the support structure adapted to hold the pushbar in the deployed position.

8. The machine of claim 7, wherein the support structure is adapted to pivot relative to the frame for storage of the support structure underneath the machine.

9. The machine of claim 7, wherein the support structure is pivotally coupled to the frame by a pair of bracket members.

10. The machine of claim 7, wherein the support structure includes a first frame member, a second frame member angularly disposed relative to the first frame member, and a third frame member extending between the first and second frame members.

11. The machine of claim 10, wherein the third frame member defines a second slot adapted to receive the second end of the harnessing member.

12. The machine of claim 7, wherein the harnessing member is a chain.

13. A pushbar assembly disposed at a front end of a machine, the pushbar assembly comprising:
 a pushbar, adapted to be carried in a pair of retention brackets at the front end of the machine in a stored position and adapted to be pivotally coupled to a frame of the machine in a deployed position of the pushbar; and
 a support assembly for the pushbar, the support assembly comprising:
  a support structure pivotally coupled to the frame; and
  a harnessing member having a first end adapted to be coupled to the pushbar and a second end adapted to be coupled to the support structure adapted to hold the pushbar in the deployed position.

14. The pushbar assembly of claim 13, wherein the support structure is adapted to pivot relative to the frame for storage of the support structure underneath the machine.

15. The pushbar assembly of claim 13, wherein the pushbar defines at least one first slot adapted to receive the first end of the harnessing member.

16. The pushbar assembly of claim 13, wherein the support structure includes a first frame member, a second frame member angularly disposed relative to the first frame member, and a third frame member extending between the first and second frame members.

17. The pushbar assembly of claim 16, wherein the third frame member defines a second slot adapted to receive the second end of the harnessing member.

18. The pushbar assembly of claim 13, wherein the harnessing member is a chain.

\* \* \* \* \*